(No Model.)

J. W. GILBERT.
Cultivator and Cotton Chopper.

No. 234,023. Patented Nov. 2, 1880.

WITNESSES:
A. Schehl
C. Sedgwick

INVENTOR:
J. W. Gilbert
BY Munn & Co
ATTORNEYS.

N. PETERS, PHOTO-LITHOGRAPHER, WASHINGTON, D. C.

UNITED STATES PATENT OFFICE.

JAMES W. GILBERT, OF HOBOKEN, ALABAMA.

CULTIVATOR AND COTTON-CHOPPER.

SPECIFICATION forming part of Letters Patent No. 234,023, dated November 2, 1880.

Application filed March 8, 1880. (No model.)

*To all whom it may concern:*

Be it known that I, JAMES WILLIAM GILBERT, of Hoboken, in the county of Marengo and State of Alabama, have invented a new and useful Improvement in Combined Cultivators and Cotton-Choppers, of which the following is a specification.

Figure 1:
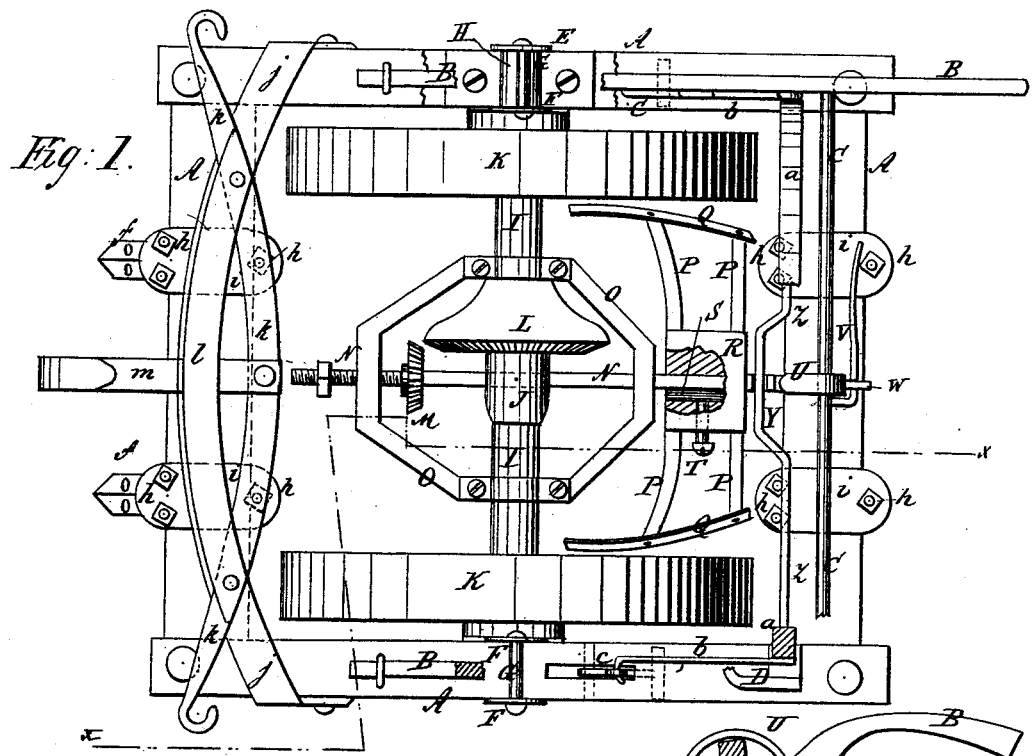
Figure 2:
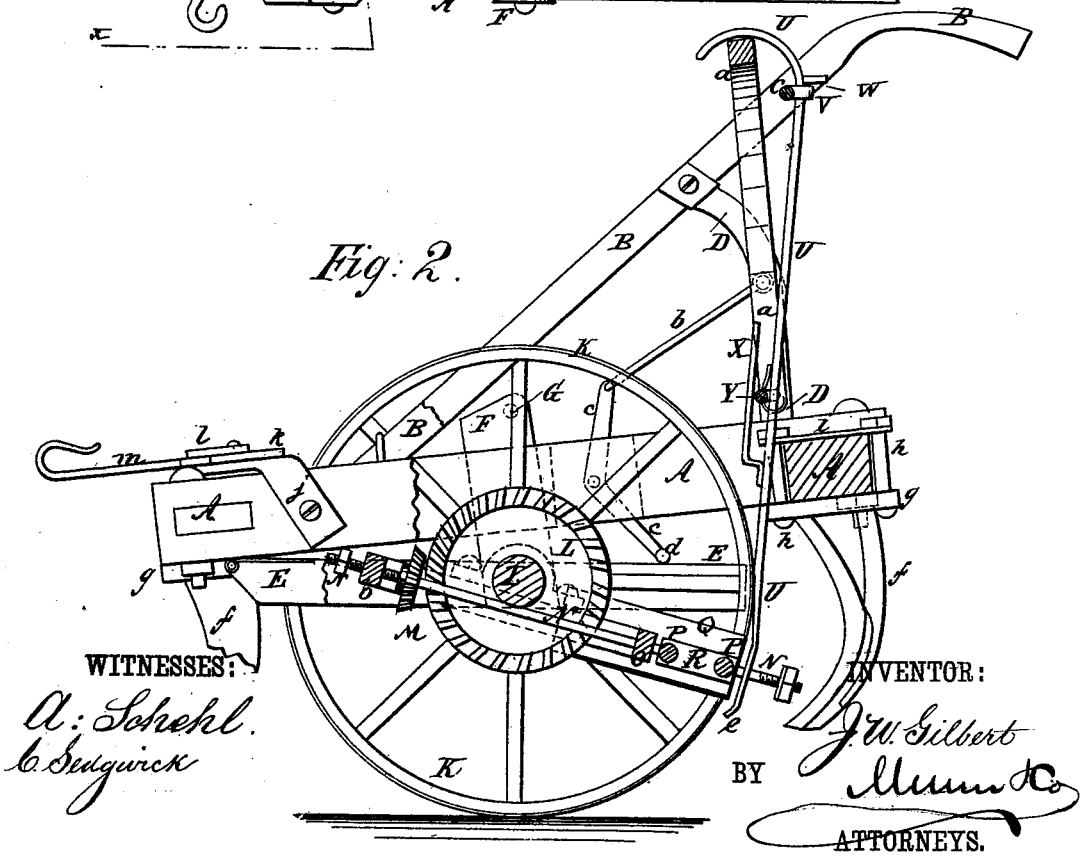

Figure 1 is a plan view of the improvement, and Fig. 2 is a side elevation, partly in section, through the line $x\ x$, Fig. 1.

Similar letters of reference indicate corresponding parts.

The object of this invention is to furnish combined cultivators and cotton-choppers so constructed as to scrape, chop, and dirt a row of plants at each passage across the field, and which can be easily controlled by the plowman.

A is a rectangular frame, to the upper sides of the forward parts of the side bars of which are attached the forward ends of the handles B. The rear parts of the handles B are connected by a rod, C, and are supported at the proper height by standards D, attached to them and to the rear parts of the side bars of the frame A.

To the lower side of the forward parts of the side bars of the frame A are hinged the forward ends of two bars, E, which pass back beneath the said side bars of the frame A.

To the opposite sides of the middle parts of the bars E are attached the lower ends of plates F, which pass up upon the opposite sides of the side bars of the frame A and are connected at their upper ends by bolts G. The guide-plates F thus keep the bars E always in the same plane with the side bars of the frame A.

To the bars E, between the guide-plates F, are attached bearings H, in which revolve the outer ends of the axles I, which axles pass through holes in the inner plates, F, to enter their bearings. The axles I are placed in line with each other, and the inner end of the one axle enters and revolves in a sleeve or socket, J, attached to the inner end of the other axle.

To the axles I, at the inner sides of the side bars of the frame A, are keyed or otherwise secured the drive-wheels K, which are thus within the frame A, and which are made with wide rims, to prevent them from sinking into the soil.

To one of the axles I, near its inner end, is attached a large bevel-gear wheel, L, the teeth of which mesh into the teeth of a smaller bevel-gear wheel, M, attached to the shaft N. The shaft N revolves and slides in bearings attached to the frame O, to which are attached bearings to receive the axles I, so that the frame O and shaft N are hung from the said axles I.

Upon the shaft N, in the rear of the frame O, are placed the hoe-arms P, to the outer ends of which are attached the hoes or choppers Q. The arms P are so arranged as to give the hoes or choppers Q a slightly spiral form.

Upon the shaft N, between the hoe-arms P, is placed a brace-block, R, the front and rear sides of which are grooved to receive the said hoe-arms P.

In one side of the perforation through the brace-block R and the hoe-arms P is formed a groove to receive a key, S, which is pressed down against the shaft N with sufficient force to prevent the said block and arms, under ordinary circumstances, from turning upon the said shaft, by a set-screw, T, passing in through one end of the said brace-block. The set-screw T is adjusted to press the key S against the shaft N with sufficient force to carry the brace-block R, hoe-arms P, and hoes Q around with the shaft N, under ordinary circumstances; but should one of the hoes Q strike an object it cannot cut the arms P and block R will slide around upon the shaft N, and thus prevent the machine from being broken. The rear end of the shaft N passes through a hole in the lower end of the lever U, the upper part of which passes through a half-keeper, V, attached to the rod C, that connects the handles B.

To the lever U is attached a pin, W, or other stop, to rest upon the half-keeper V and support the hoes in working position.

To the middle part of the lever U is attached a half-keeper, X, in which rests a wide crank, Y, formed upon the middle part of the rod Z. The ends of the crank-rod Z work in bearings in the lower parts of the standards D, that support the handles B.

To the end parts of the crank-rod Z are rigidly attached the ends of an arched bar or lever, a, to the arms of which, at a little distance from their ends, are pivoted the rear ends of the rods b.

To the forward ends of the rods b are pivoted the upper ends of the bent levers c, which pass down through slots in the side bars of the frame A and are pivoted at their angles to the said side bars in the middle parts of the said slots.

Upon the lower ends of the bent levers c are formed cross-heads d, which rest upon the upper sides of the bars E, as shown in Fig. 2. With this construction, by drawing the bend or arch of the arched lever a to the rearward, the cross-head lower ends of the bent levers c will be pressed against the bars E, and the frame A will be raised, raising the plows from the ground. At the same time the movement of the arched lever a turns the crank-rod Z and causes the crank Y to push the lower end of the lever U forward, throwing the gear-wheels M L out of gear. The lower end, e, of the lever U is bent forward, and is beveled upon its opposite sides, so that if the chopper is thrown out of gear with a hoe downward the said projecting angular end e may strike against the rear arm, P, of the said hoe, and thus turn it upward away from the ground.

The chopper may be thrown out of gear, when desired, without raising the plows from the ground by slipping the lever U out of the half-keeper V and drawing the upper end of the said lever to the rearward, the crank Y serving as a fulcrum to the said lever U.

f are the plow-standards, two of which are attached to the forward cross-bar of the frame A to receive scrapers for barring off the row, and two are attached to the rear cross-bar of the frame A, to receive sweeps or other plows for dirting or hilling the plants after the row has been chopped to a stand.

Upon the upper ends of the plow-standards f are formed cross-heads g, which rest against the lower sides of the cross-bars of the frame A, are made longer than the width of the said cross-bars, and have holes in their ends to receive the bolts h. The bolts h pass up at the front and rear sides of the cross-bars of the frame A, pass through holes in the ends of bars, plates, or yokes i, placed upon the upper sides of the said cross-bars, and have nuts screwed upon their upper ends. I prefer to use two bolts, h, in front and one in the rear, as shown in Fig. 1, to hold the plow-standard more securely against turning. With this construction, by loosening the nuts of the bolt h the plow-standards f can be adjusted farther apart and closer together, as may be required.

The lower parts of the plow-standards f are curved forward, are beveled off upon their sides, and have two or more holes formed in each side to receive the bolts by which the plow-plates are secured to their seats. The plow-plates are designed to be secured to their seats by U-bolts, which bolts and plow-plates are not shown in the drawings.

j is a curved bar, the ends of which are secured to the end parts of the side bars of the frame A, and to which, at a little distance from its ends, are attached the end parts of a bar, k, curved in the opposite direction from the bar j, and having hooks formed upon its ends to receive the stay-chains usually attached to a double-tree. The bolts or rivets that secure the bars j k to each other also secure the ends of a bar, l, placed above and parallel with the middle part of the bar j, to serve as a keeper for the draft-hook m, pivoted to the center of the bar k, and which may be replaced by a tongue, if desired.

Having thus fully described my invention, I claim as new and desire to secure by Letters Patent—

1. In a combined cultivator and cotton-chopper, the combination, with the frame A, carrying the plows, and the axles I, carrying the drive-wheels K, of the hinged bars E, bolts G, and the guide-plates F, substantially as herein shown and described, whereby the plows may be raised from the ground, as set forth.

2. In a combined cultivator and cotton-chopper, the combination, with the chopper-shaft N and the arms P, carrying the hoes Q, of the brace-block R, the key S, and the set-screw T, substantially as herein shown and described, whereby the hoe-arms are connected with the shaft and allowed to turn back should the hoes strike an obstruction, as set forth.

3. In a combined cultivator and cotton-chopper, the combination, with the handle-standards D, the slotted side bars of the frame A, carrying the plows, and the hinged bars E, carrying the drive-wheel axles, of the arched lever a, the connecting-bars b, and the bent levers c, substantially as herein shown and described, whereby the frame A can be raised, as set forth.

4. In a combined cultivator and cotton-chopper, the combination, with the arched lever a, that raises the frame A, and the lever U, that slides the shaft N, of the crank-rod Y Z and the half-keeper X, whereby the plows can be raised and the chopper thrown out of gear by a single movement of the lever a, as set forth.

JAMES WILLIAM GILBERT.

Witnesses:
R. D. HUDSON,
W. J. THORNTON.